United States Patent
Iida et al.

[19]

[11] Patent Number: 5,958,071
[45] Date of Patent: *Sep. 28, 1999

[54] METHOD AND SYSTEM FOR CONTROLLING PARALLEL EXECUTION OF JOBS

[75] Inventors: Tuneo Iida; Kazuhiko Watanabe, both of Yokohama; Hirofumi Nagasuka, Kawasaki, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/630,077

[22] Filed: Apr. 9, 1996

[30] Foreign Application Priority Data

Apr. 11, 1995 [JP] Japan .................................. 7-085091

[51] Int. Cl.$^6$ .................................................. G06F 11/00
[52] U.S. Cl. .............................................................. 714/17
[58] Field of Search ........................ 395/182.15, 183.14, 395/2.11, 2.41, 21, 582, 671, 676, 706, 379, 596; 364/133, 931.41; 714/17, 38; 709/101, 106; 712/203, 235, 246

[56] References Cited

U.S. PATENT DOCUMENTS

| | | | |
|---|---|---|---|
| 3,662,401 | 5/1972 | Collins et al. ................................ | 444/1 |
| 4,319,321 | 3/1982 | Anastas et al. ............................ | 364/200 |
| 4,495,562 | 1/1985 | Yamaji et al. ............................. | 364/200 |
| 4,918,595 | 4/1990 | Kahn et al. ................................ | 364/200 |
| 5,113,523 | 5/1992 | Colley et al. .............................. | 395/800 |
| 5,179,702 | 1/1993 | Spix et al. ................................. | 395/650 |
| 5,465,369 | 11/1995 | Minca ................................... | 395/200.03 |
| 5,594,901 | 1/1997 | Andoh ...................................... | 395/674 |
| 5,634,120 | 5/1997 | Nagasuka et al. ........................ | 364/608 |
| 5,642,508 | 6/1997 | Miyazawa ................................. | 395/674 |
| 5,692,193 | 11/1997 | Jagannathan et al. .................... | 395/676 |
| 5,752,030 | 5/1998 | Konno et al. ............................. | 395/672 |

FOREIGN PATENT DOCUMENTS

| 63-211033 | 9/1988 | Japan ............................... | G06F 11/14 |
|---|---|---|---|
| 6-202881 | 7/1994 | Japan ................................ | G06F 9/46 |

*Primary Examiner*—Robert W. Beausoliel, Jr.
*Assistant Examiner*—Stephen C. Elmore
*Attorney, Agent, or Firm*—Antonelli, Terry, Stout & Kraus, LLP

[57] ABSTRACT

A computer system and a parallel execution control method thereof. A job execution managing module includes a job control statement interpreting module for deciding by interpretation of job control statements whether jobs registered by a job registration processing module are capable of undergoing parallel execution. For the jobs susceptible to the parallel execution, the job execution managing module commands reregistration of such job to the job registration processing module. The job control statement interpreting module further decides by interpreting the control statement whether execution of individual job steps of registered jobs are to be skipped or not. The job step decided to be skipped is inhibited from execution by a step execution control module. Time taken for execution of jobs and job steps can be shortened.

8 Claims, 16 Drawing Sheets

FIG. 2A

EXAMPLE OF JCS (JOB CONTROL STATEMENT) FOR EXECUTING n JOBS IN PARALLEL

| //JOB NAME  JOB SUBJOB=n | ~201 |

FIG. 2B

EXAMPLE OF JCS FOR SKIPPING STEP WITHOUT EXECUTION

| //STEP NAME  EXEC PGM=PROGRAM NAME,SKIP=YES | ~202 |

FIG. 2C

EXAMPLE OF JCS FOR EXECUTING n STEPS IN PARALLEL

| //STEP NAME  EXEC PGM=PROGRAM NAME,SUBJOB=n | ~203 |

FIG. 2D

EXAMPLE OF JCS FOR ALLOWING A GIVEN STEP TO BE EXECUTED IN PARALLEL WITH ANOTHER STEP

| //STEP NAME  EXEC PGM=PROGRAM NAME,SUBJOB=YES | ~204 |

FIG.3

510 JOB EXECUTION MANAGEMENT TABLE

| | |
|---|---|
| JOB NAME | ~511 |
| JCS-DESIGNATED VALUE OF NUMBER OF TIMES OF PARALLEL EXECUTIONS FOR JOB | ~512 |
| NUMBER OF TIMES GIVEN JOBS ARE EXECUTED IN PARALLEL | ~513 |
| POINTER TO STEP MANAGEMENT TABLE (FOR FIRST EXECUTION) | ~514 |
| POINTER TO STEP MANAGEMENT TABLE (FOR SECOND EXECUTION) | ~515 |
| ⋮ | |

FIG.4

520 STEP MANAGEMENT TABLE

| | | |
|---|---|---|
| STEP NAME OF FIRST STEP | PRESENCE OR ABSENCE OF SKIP DESIGNATION OF STEP EXECUTION OF FIRST STEP | ~521 |
| STEP NAME OF SECOND STEP | PRESENCE OR ABSENCE OF SKIP DESIGNATION OF STEP EXECUTION OF SECOND STEP | ~522 |
| ⋮ | | ~523 |

FIG.12A

```
//JOB1    JOB
//STEP1   EXEC  PGM=DATAGEN
//IN1     DD    DSN=INPUT.DATA
//OUT1    DD    DSN=TEMP.A.DATA
//
```
210

FIG.12B

```
//JOB2    JOB   SUBJOB=3
//STEP2   EXEC  PGM=SORT
//IN2     DD    DSN=TEMP.A.DATA
//OUT2    DD    DSN=TEMP.B.DATA
//
```
211

FIG.12C

```
//JOB3    JOB
//STEP3   EXEC  PGM=DATALINK
//IN3     DD    DSN=TEMP.B.DATA
//OUT3    DD    DSN=OUTPUT.DATA
//
```
212

```
//JOB5    JOB
//STEP4   EXEC   PGM=COMPILE,SUBJOB=YES
//IN4     DD     DSN=SOURCE4
//OUT4    DD     DSN=OBJECT4
/*
//STEP5   EXEC   PGM=COMPILE
//IN5     DD     DSN=SOURCE5
//OUT5    DD     DSN=OBJECT5
/*
//STEP6   EXEC   PGM=LINKAGE
//IN64    DD     DSN=OBJECT4
//IN65    DD     DSN=OBJECT5
//OUT6    DD     DSN=LOAD5
//
```
230

FIG.21

| DATA SET NAME 1 | COMMON OR EXCLUSIVE USE | AVAILABILITY FOR USE |
|---|---|---|
| DATA SET NAME 2 | COMMON OR EXCLUSIVE USE | AVAILABILITY FOR USE |
| DATA SET NAME 3 | COMMON OR EXCLUSIVE USE | AVAILABILITY FOR USE |
| ⋮ | ⋮ | ⋮ |

700 CONTROL BLOCK REQUIRED FOR JOB EXECUTION 701  702  703

METHOD AND SYSTEM FOR CONTROLLING PARALLEL EXECUTION OF JOBS

BACKGROUND OF THE INVENTION

The present invention generally relates to a computer system. More particularly, the invention is concerned with a method and a system for controlling parallel execution of jobs and/or job steps, which method and system are advantageously and profitably suited for execution of jobs including job steps executable in parallel.

With the conventional techniques directed to reexecution of a job (i.e., restart of execution of a job after abnormal interruption thereof), such arrangement is adopted that a job execution which ended at a given job step due to occurrence of abnormality in that job step or for other reason can be restarted from that given job step, as is disclosed, for example, in JP-A-63-211033. More specifically, upon reexecution of a job ended abnormally, the job is reregistered, whereupon on the basis of information indicating to which step the job execution has been completed, the job is executed while skipping the job steps to one preceding to the job step at which abnormality occurred, to thereby allow the job to be reexecuted, starting from that preceding step.

On the other hand, in conjunction with parallel execution of job steps, such a system or scheme has already been proposed in conjunction with a job composed of a plurality of job steps that information of designation indicating whether or not a given job step can be executed in parallel with other job step belonging to the same job is affixed to a relevant control statement commanding the job step execution, to thereby allow a plurality of job steps to be executed concurrently, as is disclosed, for example, in JP-A-6-202881.

The first mentioned job reexecution technique (JP-A-63-211033) can certainly ensure the function for recovering or restoring the job whose execution ended with abnormality. However, no consideration is paid to reduction or decrease of the time required for execution of the job. Moreover, with this conventional technique, it is impossible to execute a plurality of same job steps concurrently in parallel with one another, giving rise to another problem.

On the other hand, in the case of the second mentioned prior art (JP-A-6-202881), parallel execution can be performed only for those job steps which differ from one another and which belong to a same job, and no consideration is paid to parallel execution of a plurality of same job steps, presenting thus a problem that the time taken for execution of job step can not be shortened.

SUMMARY OF THE INVENTION

In the light of the state of the art reviewed above, it is a primary object of the present invention to provide a method and a system for controlling parallel execution of jobs by executing a plurality of jobs of a same content to thereby allow a plurality of same job steps belonging to a same job to be executed in parallel with a view to shortening the time required for execution of the job step(s).

In general, in order to make it possible to shorten the time taken for execution of job steps by executing a plurality of same job steps, it is required that input data to be available for the relevant job step can be divided and that no requirement is imposed concerning the sequential relation among the processings of the input data.

It is a second object of the present invention to provide a method and a system for controlling parallel execution which allow a given job step belonging to a job composed of plural job steps to be executed in parallel with other job step belonging to the same job as the aforementioned given job step with a view to reducing the time taken for execution of the job.

In view of the first object mentioned above, it is taught according to a first aspect of the present invention that by taking advantage of the job reexecuting technique known heretofore, as mentioned above, a job which is being executed is registered for execution during execution of that job, not upon occurrence of abnormality, for executing these same jobs in parallel to thereby allow same job steps belonging to one and the same job to be executed in parallel.

In view of the second object of the invention mentioned previously, it is proposed according to a second aspect of the present invention that a plurality of same jobs (i.e., jobs of same content) are executed in parallel, wherein in the execution of a first one of the same jobs, a given step is skipped without executing it for thereby allowing a succeeding job step to be executed, while in a second one of the same jobs being executed in parallel with the first job, the given job step of the first job skipped from execution is executed. Thus, parallel execution of different job steps belonging to a same job can be achieved.

In a preferred mode for executing the invention, job control statements are analyzed or interpreted by a job control language translating module, to thereby decide whether or not a certain number of same jobs are to be executed in parallel and whether or not execution of certain job step(s) is to be skipped.

For the registration of jobs, there is provided a job registration processing module as a part of a job execution managing module, wherein for a job which is destined for parallel execution, the job is again registered by the job registration processing module.

In still another preferred mode for carrying out the invention, a step execution managing module is provided for skipping a given job step without executing it, when skipping of that given job step is indicated or commanded in a relevant control statement.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 2A to 2D are views for illustrating, respectively, description forms of job control statements;

FIG. 3 is a view for illustrating a data structure of a job execution management table of each job for allowing job management by a job execution managing module;

FIG. 4 is a view for illustrating data structures of a step management table provided for each job for managing executions of job steps in step execution spaces;

FIGS. 12A, 12B and 12C are views for illustrating description forms of the job control statement in the case where parallel execution of jobs are to be performed;

FIG. 21 is a view showing, by way of example, a data structure of a control block generated by a job control statement interpreting module, which is required for execution of a job.

DESCRIPTION OF THE PREFERRED EMBODIMENTS

Figure 1:
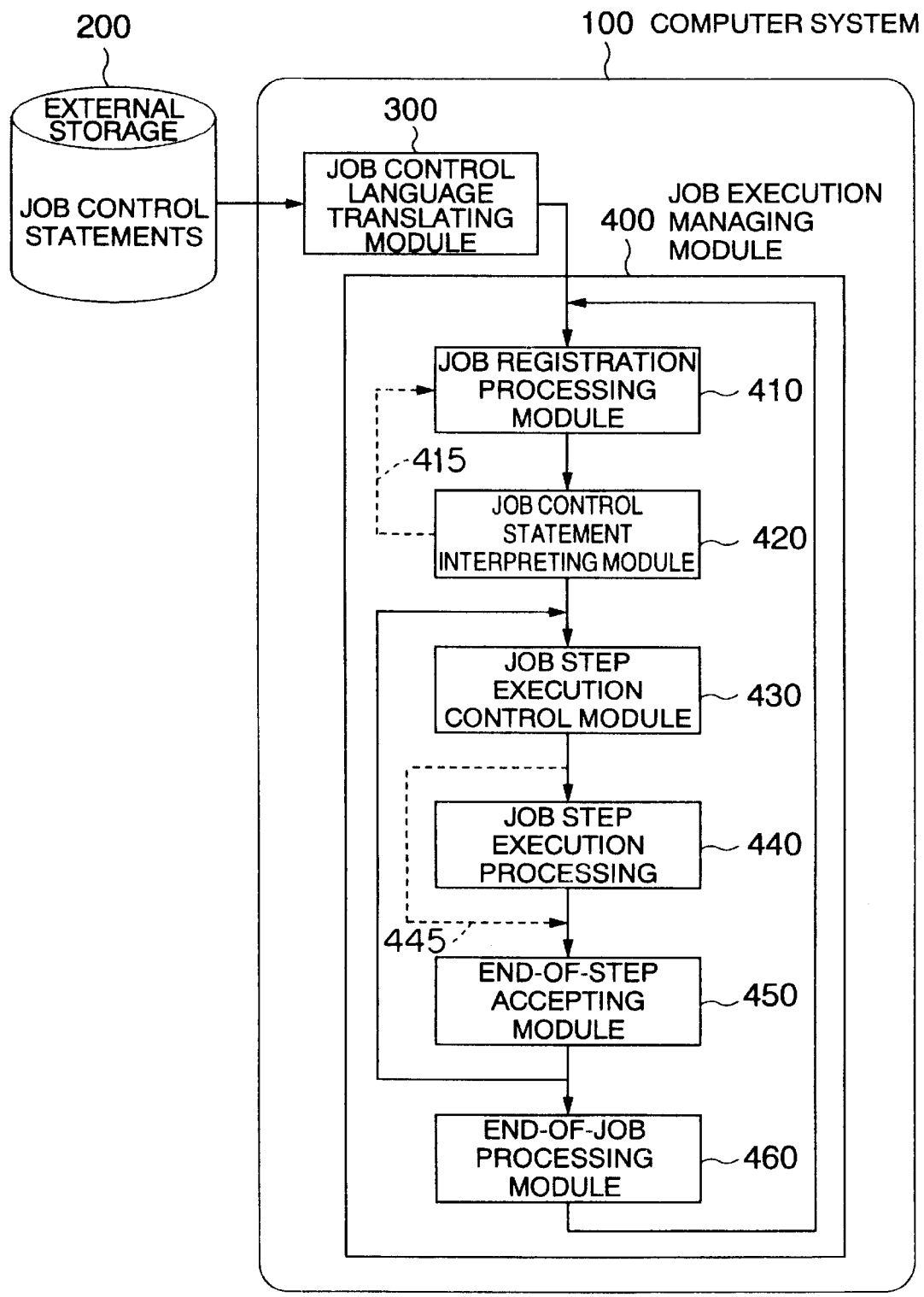
FIG. 1 is a schematic block diagram showing an arrangement of a system for controlling parallel execution of jobs according to an exemplary embodiment of the present invention.

Now, the present invention will be described in detail in conjunction with what is presently considered as preferred or typical embodiments thereof by reference to the drawings. In the following description, like reference characters designate like or corresponding parts throughout the several views.

FIG. 1 is a schematic block diagram showing an arrangement of a system for controlling parallel execution of jobs and job steps according to an exemplary embodiment of the invention.

In FIG. 1, reference numeral 100 denotes a computer system, and 200 denotes an external storage. There are stored job control statements in the external storage 200. When a job control statement is read out from the external storage 200 and then inputted to the computer system 100, the job control statement is translated by a job control language translating module 300, which is then followed by execution of the job control statement by a job execution managing module 400 as a job in accordance with the result of the translation.

FIGS. 2A to 2D are views for illustrating, by way of example only, forms of descriptions of job control statements, respectively.

More specifically, an exemplary description form of job control statement indicating parallel execution of n jobs is shown at 201 in FIG. 2A. By affixing a designating description "SUBJOB=n" to a statement "JOB" describing the attributes of the job, it is possible to command execution of the n jobs in parallel in a plurality of spaces by resorting to a time sharing technique.

Referring to FIG. 2B, there is shown at 202 an exemplary form of description of a job control statement for skipping a step without execution. By affixing the designation "SKIP=YES" to an execute statement "EXEC" which commands execution of a step contained in a job, it is possible to validate skipping of job step(s) of concern from execution.

By using the job control statements 201 and 202, basic concept of the present invention can certainly be realized. However, in order to simplify the designation of the job control statement, it is preferred to make it possible to use similar functions, as illustrated exemplarily at 203 and 204 in FIGS. 2C and 2D, respectively.

Now referring to FIG. 2C, there is shown at 203 an exemplary description form of a job control statement for allowing execution of n job steps in parallel. By affixing "SUBJOB=n" to the execute statement "EXEC" designating execution of a given job step, it is possible to command or validate parallel execution of only the n given job steps each of a same content. Thus, when this designation is affixed, the n same job steps are executed in parallel, while the other job steps are executed only once in a first job executively, while in second and third jobs executed in parallel, the other steps than the given job step mentioned above are skipped from execution.

Next, referring to FIG. 2D, there is shown at 204 an exemplary description form of a job control statement for allowing a given step to be executed in parallel with another or other step or steps. By affixing designation "SUBJOB=YES" to an execute statement "EXEC" indicating execution of a job step of concern, the latter can be executed as another job in another space, while in the relevant space for the given job steps, another job step rather than the given job step is executed. Thus, by affixing this designation, two relevant job steps can be executed in parallel, while the given step is skipped, whereas in a second job executed in parallel, any other job step than the given one are skipped. In this manner, the function illustrated at 204 in FIG. 2D can be realized.

FIGS. 3 and 4 are views for illustrating, by way of example only, data structures of a job execution management table 510 and a step management table 520 respectively.

The job execution management table 510 is provided for each of the jobs for managing the number of times a given job is to undergo the parallel execution. On the other hand, the step management table 520 is so structured that individual steps of the given job can collectively be managed by using the single table. However, when a given job step is to undergo parallel execution, there is required the step managing table for each of the spaces used for the parallel execution.

By providing the job execution management table 510 and the step management table 520, there can be realized management as to the number of the spaces required for the parallel execution of the job steps as well as management as to which of the job steps is to be executed in which of the spaces.

Figure 5:
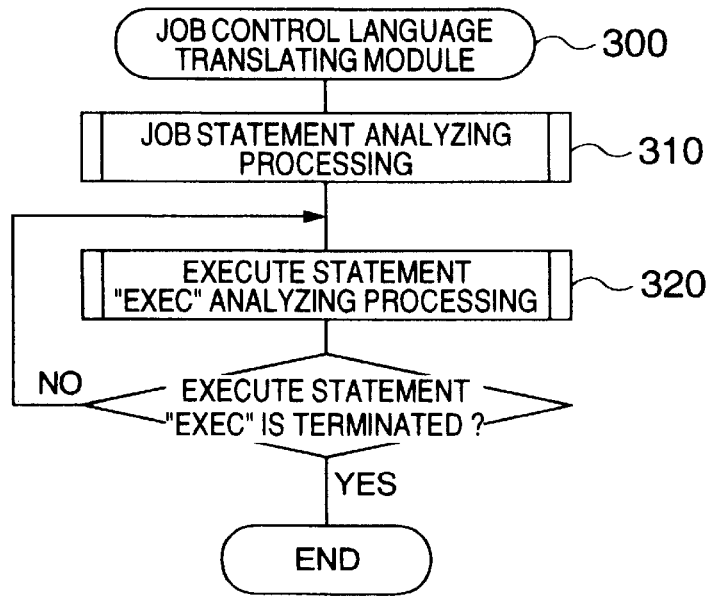
FIG. 5 is a flow chart for illustrating operation procedures performed by a job control language translating module.
Figure 6:
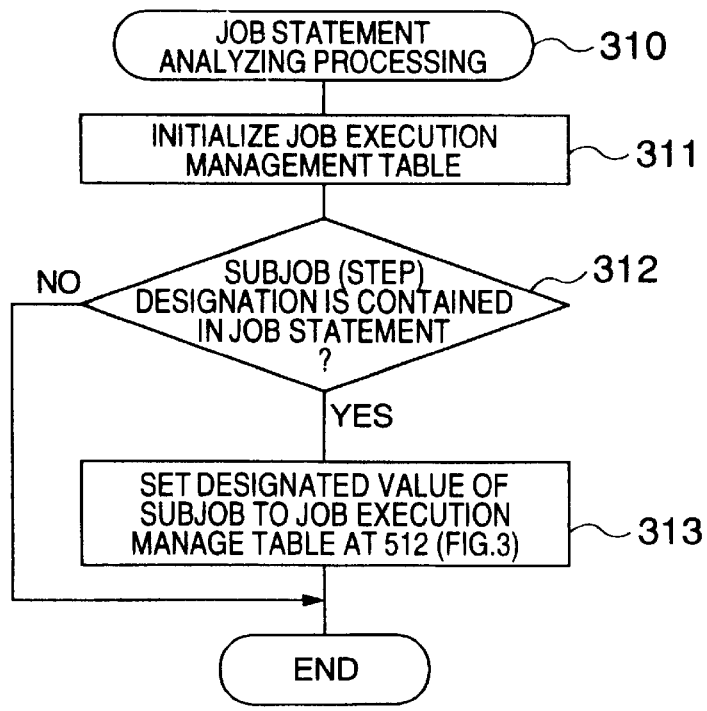
FIG. 6 is a flow chart for illustrating operation procedures performed by a job statement analyzing module.
Figure 7:
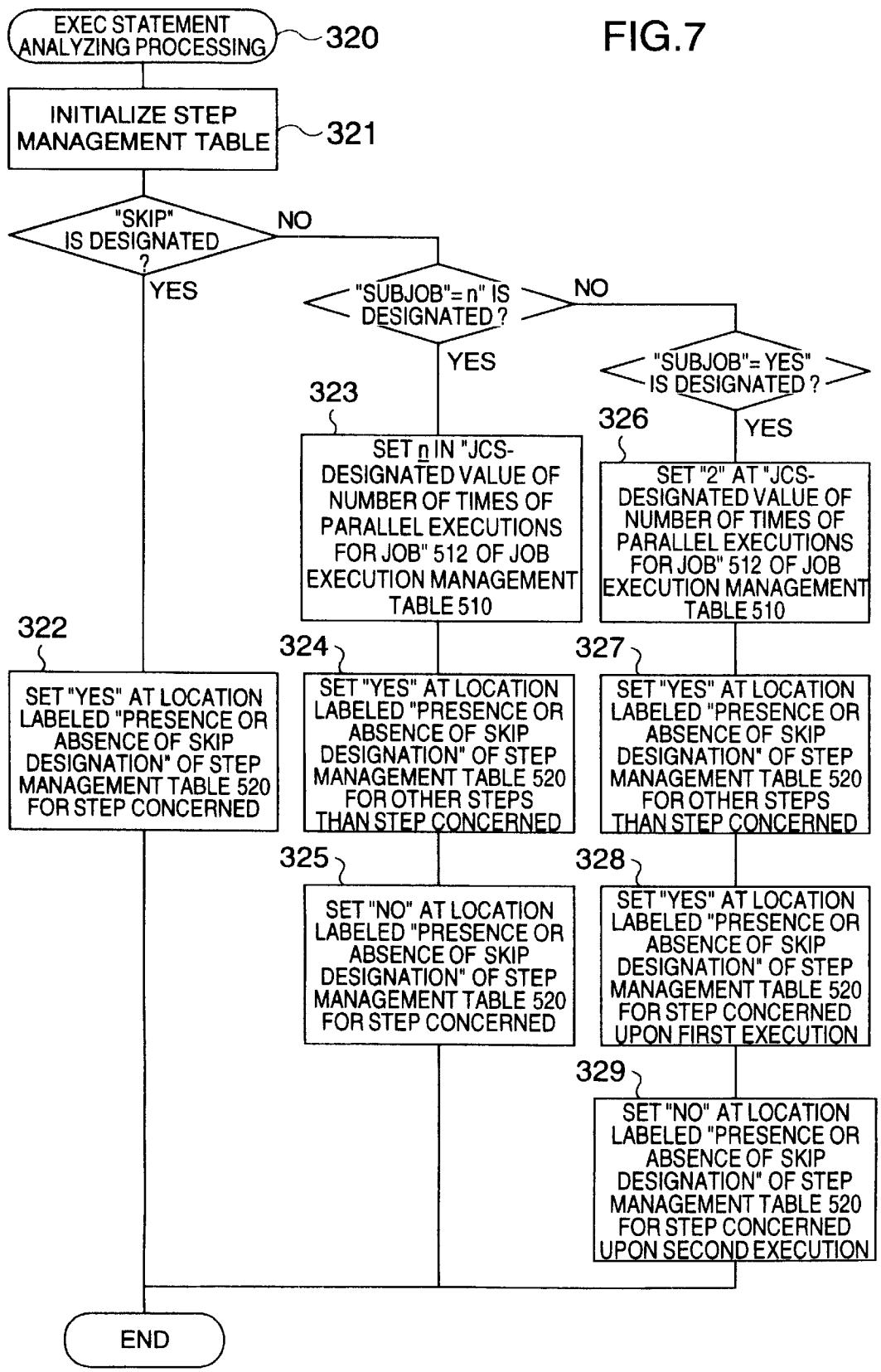
FIG. 7 is a flow chart for illustrating operation procedures performed by an execute statement analyzing module.

FIGS. 5, 6 and 7 are flow charts for illustrating, by way of example, processing procedures performed by the job control language translating module 300.

The job control language translating module 300 is adapted to translate the job control statements of the description forms such as those 203 and 204 mentioned hereinbefore, to thereby set up the job execution management table 510 and the step management table 520 shown in FIGS. 3 and 4, respectively.

At first, in a job statement analyzing module 310, job statement "JOB" contained in the job control state as inputted is analyzed, the result of which is entered in the job execution management table 510. In that case, when the job statement "JOB" contains the designation "SUBJOB=n" indicating that a number n of the relevant jobs are to be executed in parallel, as indicated in FIG. 2 at 201, the designated number value "n" is set in the job execution management table 510 at a location 512 shown in FIG. 3 and labelled "JCS-DESIGNATED VALUE OF NUMBER OF TIMES OF PARALLEL EXECUTION FOR JOB" (step 313 in FIG. 6).

Subsequently, in order to analyze the execute statement "EXEC" designating execution of the individual job steps stipulated in the job control statement, a processing for analyzing an execute statement "EXEC" is performed a number of times corresponding to the number of the execute statements "EXEC" in a step 320 (FIG. 5), whereby the step management tables 520 shown in FIG. 4 are set up in correspondence to the individual execute statements "EXEC", respectively.

In this conjunction, it should be mentioned that when the designation "SKIP=YES" (see 202 in FIG. 2) indicating that a given job step is to be skipped without executing it is contained in the execute statement "EXEC", then data "YES" indicating the skip designation is placed at a location allocated to the given step in the step management table 520 (FIG. 4). (See a step 322 in FIG. 7.)

Further, when the designation "SUBJOB=n" indicating n parallel executions only of a given job step (see FIG. 2, 203) is contained in the execute statement "EXEC", it is then automatically decided that the number n of given job step are to be executed in parallel and that other steps than the given job step are allowed to be executed only in association with a first job while in the succeeding jobs inclusive of a second job, the given job step is to be skipped, whereupon the number n is placed at the location "JCS-DESIGNATED VALUE OF NUMBER OF TIMES OF PARALLEL EXECUTIONS FOR JOB" 512 of the job execution management table 510 for the given job (step 323 in FIG. 7). Further, in the step management table(s) 520 for the step(s) except for the given step, "YES" is set at a location labeled "PRESENCE OR ABSENCE OF SKIP DESIGNATION" (see FIG. 4) in a step 324, while in the step management table(s) 520 provided in association with the given step, "NO" is set at the location labeled "PRESENCE OR ABSENCE OF SKIP DESIGNATION" in a step 325 (FIG. 7).

Furthermore, when the designation "SUBJOB=YES" indicating parallel execution of a given job step and another job step is affixed to an execute statement "EXEC" (see FIG. 2, 204), it is then automatically decided that two relevant jobs are first executed in parallel and that the other steps except for the given job step are to be executed in a first job, while in a second job, only the given job step is to be executed, whereon a numerical value "2" is set at the location labeled "JCS-DESIGNATED VALUE OF NUMBER OF TIMES OF PARALLEL EXECUTIONS FOR JOB" 512 of the job execution management table 510 provided for the given job (see FIG. 7, step 326) and additionally "YES" is set at the location labeled "PRESENCE OR ABSENCE OF SKIP DESIGNATION" for the other step than the given step of the second job (step 327 in FIG. 7), while "YES" is set at the location labeled "PRESENCE OR ABSENCE OF SKIP DESIGNATION" in the step management table 520 for the given step of the first job (step 328 in FIG. 7) with "NO" being set at the location labeled "PRESENCE OR ABSENCE OF SKIP DESIGNATION" of the step management table 520 for the given step of the second job (step 329 in FIG. 7).

Figure 8A:
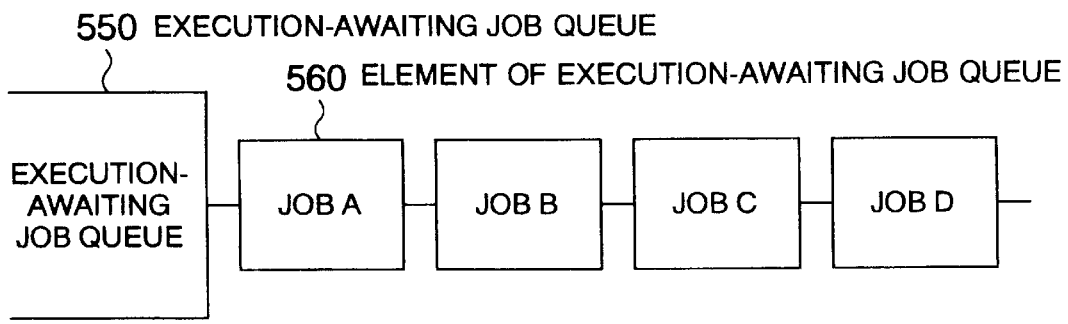
FIG. 8A is a view for illustrating an execution-awaiting job queue which is referenced by a job execution managing module upon job execution.
Figure 8B:
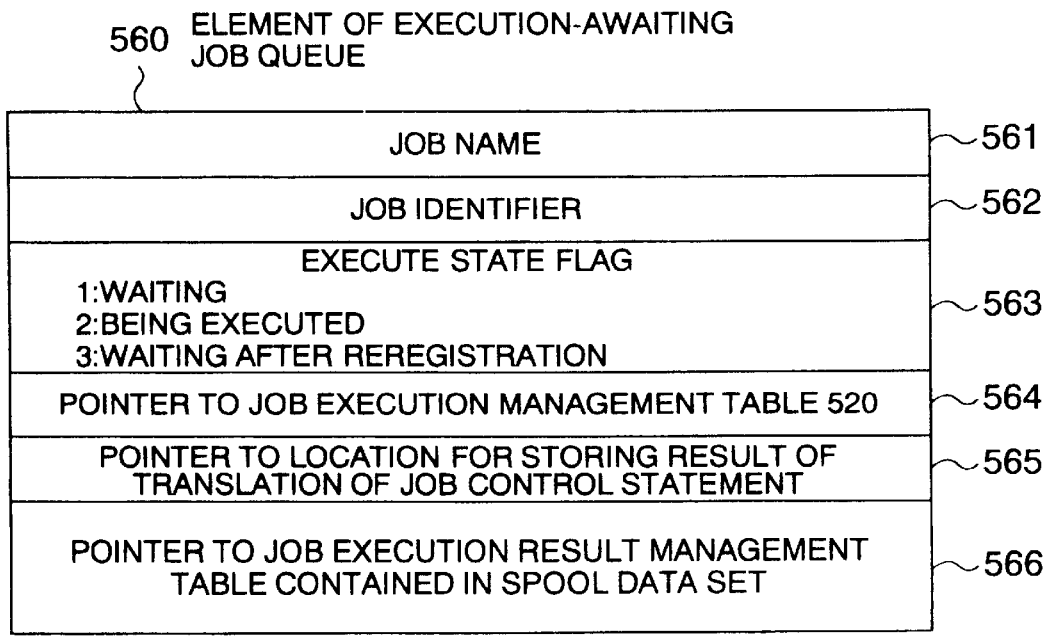
FIG. 8B is a view for illustrating a data structure of an element of the execution-awaiting job queue.

FIG. 8A is a view for illustrating, by way of example, an execution-awaiting job queue 550 which is referenced by the job execution managing module 400 upon job execution, and FIG. 8B is a view for illustrating a data structure of an element of the execution-awaiting job queue 550. As can be seen from FIG. 8A, in the execution-awaiting job queue 550, there are queued the elements 560.

Figure 9:
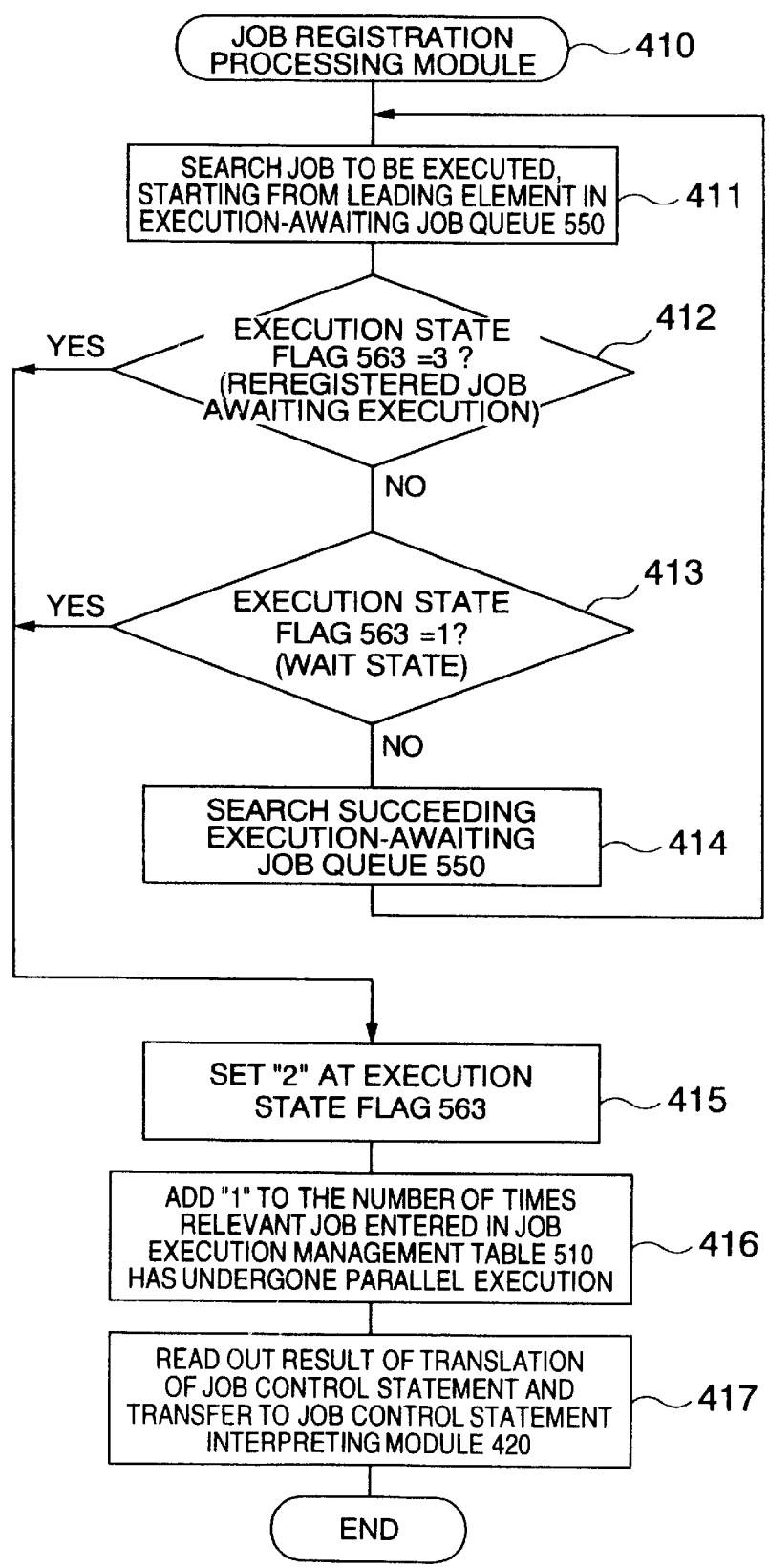
FIG. 9 is a flow chart for illustrating a processing procedure executed by a job registration processing module.
Figure 10:
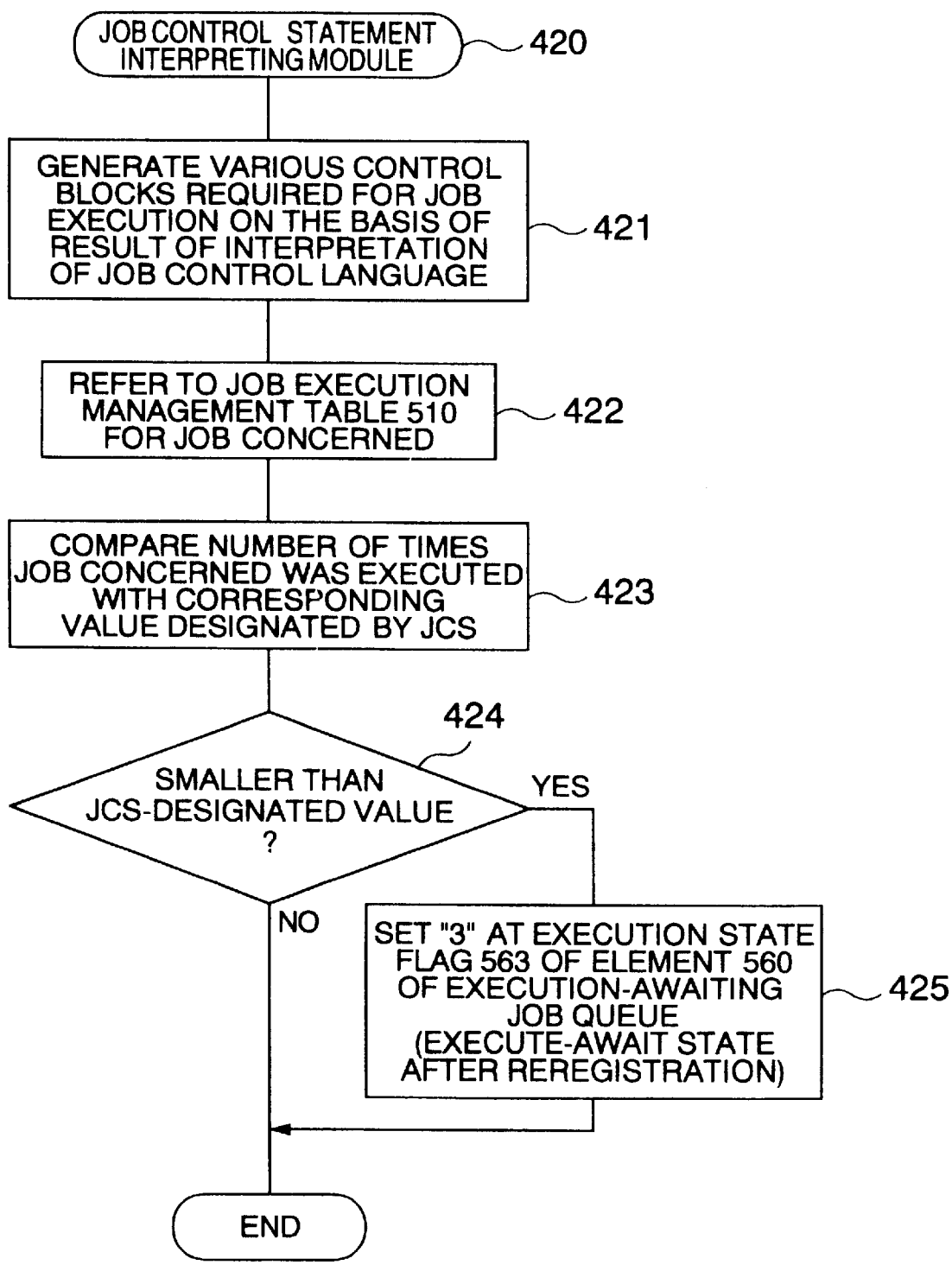
FIG. 10 is a flow chart for illustrating a processing procedure executed by a job control statement interpreting module.
Figure 11:
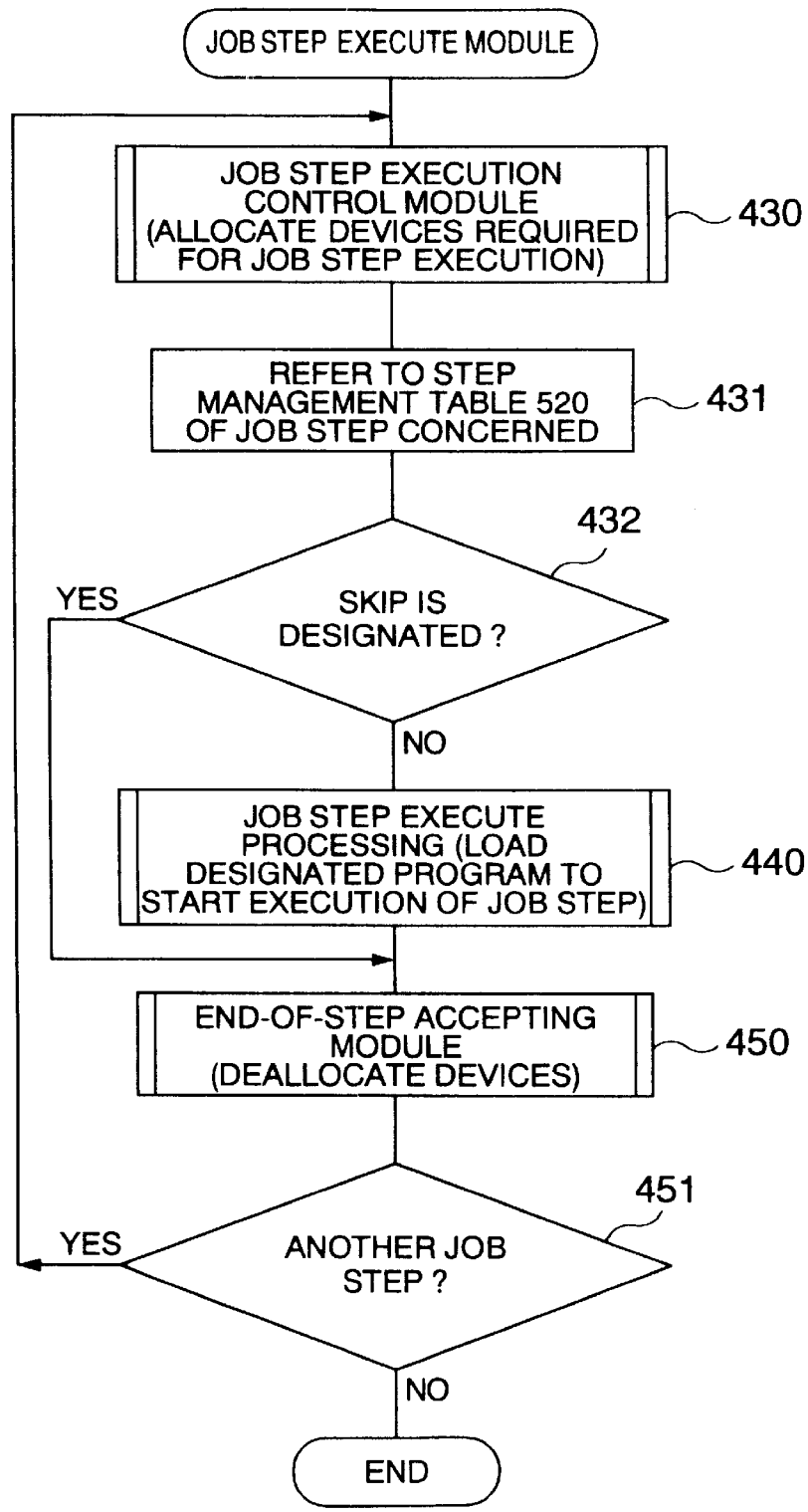
FIG. 11 is a flow chart for illustrating processing procedures executed by a step execution control module, a step execution processing module and an end-of-step-execution admitting module.

FIGS. 9, 10 and 11 are flow charts illustrating processing procedure for executing job steps in the job execution managing module 400.

In the computer system 100, the job execution managing module 400 is provided in association with each of address spaces reserved for the execution of the job. More specifically, in the job execution managing module 400 provided in each address space, one job can be executed.

FIG. 9 is a flow chart for illustrating a processing procedure executed by a job registration processing module 410. More specifically, the module reference to an execution state flag 563 of the element 560 of the execution-awaiting job queue (FIG. 8B) constituting a member of the elements 560 of the execution-awaiting job queue, to thereby search the job to be executed in the relevant address space associated with the job execution managing module 400 mentioned just above (FIG. 9, step 411). In that case, not only the job awaiting the execution as indicated by the execution state flag 563 of "1" (step 413 in FIG. 9) but also an execution awaiting a job to be registered again as indicated by the execution state flag 563 of "3" is searched as the jobs to be executed. When the job to be executed is found, a numerical value "2" is set at the execution state flag 563 of the element 560 of the execution-awaiting job queue corresponding to the job as found.

As will now be understood from the foregoing, the job execution managing module 400 extracts only the job for which "3" is set at the execution state flag 563, indicating the execution wait state after the reregistration or only the job for which "1" is set at the execution state flag 563, indicating the execution waiting state, whereas the job for which the execution state flag 563 is "2", indicating that the job is being executed, is left as it is. Thus, by setting "2" at the execution state flag 563 after fetching the job of concern, that job is usually inhibited from being executed by the job execution managing module 400 provided in association with other address space.

Furthermore, in the job registration processing module 410, the number of times the relevant jobs are executed in parallel (see FIG. 3, 513) is incremented by one in order to manage the number of times the relevant jobs have been executed in parallel (step 416, FIG. 9). In this conjunction, the data "NUMBER OF TIMES GIVEN JOBS ARE EXECUTED IN PARALLEL" 513 is made use of in the job control statement interpreting module 420 for making decision as to whether the number of times the jobs of concern are to be reexecuted has been reached. The processing procedure executed by the job control statement interpreting module 420 will described below.

FIG. 10 is a flow chart for illustrating an execution procedure in the job control statement interpreting module 420 which constitutes a part of the job execution managing module 400. Referring to the figure, in a step 421, the job control statement interpreting module 420 performs a processing for generating control blocks 700 which is required for the execution of jobs selected by the job registration processing module 410. FIG. 21 is a view showing, by way of example, a structure of the control block 700, which is destined for managing resources such as data sets, devices and the like which are to be used upon execution of the job of concern and contains information 702 concerning common use or exclusive use of each resource together with information 703 concerning availability of the resource upon execution of job. When jobs are to be executed, the resources are allocated by the step execution control module 430 on the basis of the information contained in the control block 700.

Turning back to FIG. 10, the job control statement interpreting module 420 makes reference to the job execution management table 510 for the job concerned in a step 422, to compare in a step 423 the number of times the job concerned has been executed in parallel (set in the step 416) with the corresponding value 512 designated by the job control statement "JCS" to thereby make decisions as to whether the job concerned is to be reexecuted in a step 424. When it is decided that the job concerned has to be executed again, the value "2" of the execution state 563 is replaced by the value "3" which indicates the execution wait state after reregistration (step 425). Thus, the job execution managing module 400 of another address space is allowed to select the job concerned for the reexecution thereof (step 415).

FIG. 11 is a flow chart for illustrating processing procedures executed through cooperation of the step execution control module 430, the step execution processing 440 and the end-of-step accepting module 450 incorporated in the job execution managing module 400.

Referring to the figure, in a step 430 for execution processing of job steps, devices required for the execution are allocated, whereon programs to be executed are loaded and then executed (step 446), and after executions have been completed, allocation of the devices are cleared (step 450). The series of processings mentioned above are executed for each of the job steps. In the course of the execution, the step management tables 520 for the job steps concerned are referenced (step 431), and for the job step having the designation "SKIP", the step execution processing 440 is not carried out (see a step 432 in FIG. 11 and step 445 in FIG. 1).

FIGS. 12A, 12B and 12C are views for illustrating, by way of example only, description forms of the job control statement "JCS" in the case where jobs are executed in parallel. Referring to the figure, such a work is presumed that a job "JOB 1" 210 (FIG. 12A) destined for generating data, a job "JOB 2" 211 (FIG. 12B) for sorting the data generated by the job "JOB 1", and a job "JOB 3" (FIG. 12C) for totalization or linkage of the data resulting from the sorting are executed. In this conjunction, there may be encountered such a case in which the data are first divided and then the divided data are sorted separately from one another, although it depends on the data structure.

Figure 13:
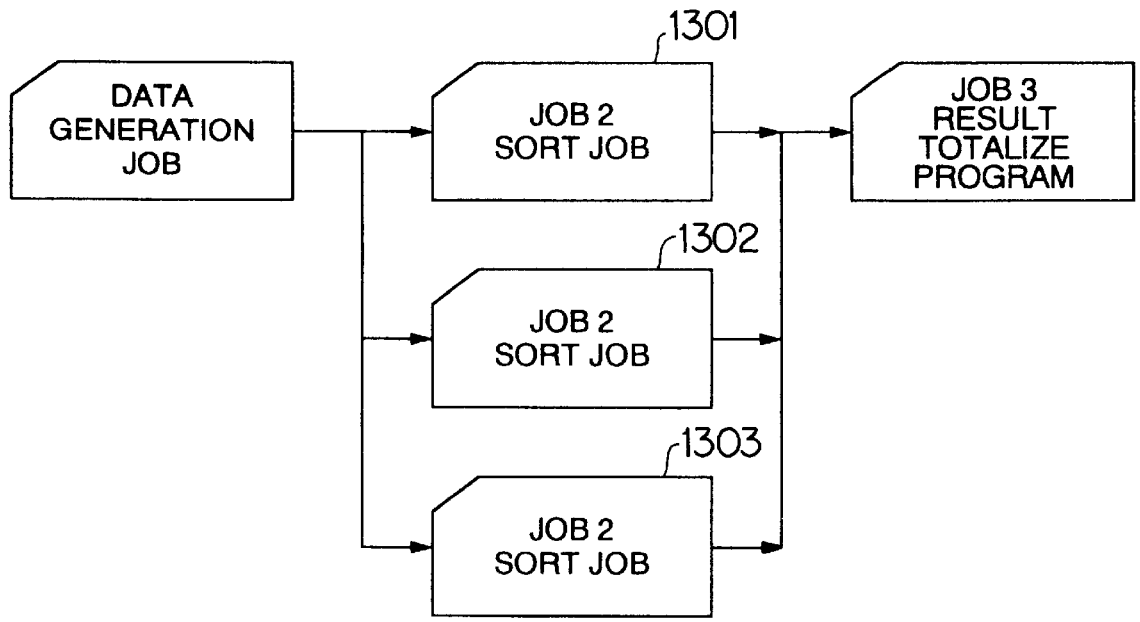
FIG. 13 illustrates, by way of example only, a sequence of executions of individual jobs in the case of parallel execution of jobs.

In this manner, in the case where a plurality of same jobs can be executed in parallel, designation "SUBJOB=n" is inserted in the job statement "JOB 2", as illustrated in FIG. 12B. In that case, a plurality of same jobs "JOB 2" are executed in parallel, where the time taken for executing the jobs "JOB 2" can be shortened. Parenthetically, FIG. 13 illustrates, by way of example only, a sequence of executions of the individual jobs on the assumption that designation "SUBJOB=3" is contained in the job control statement "JCS" for the sorting job "JOB 2" shown in FIG. 12. It can be seen from FIG. 13 that three sort jobs 1301–1303 are executed in parallel with one another.

Figure 14:
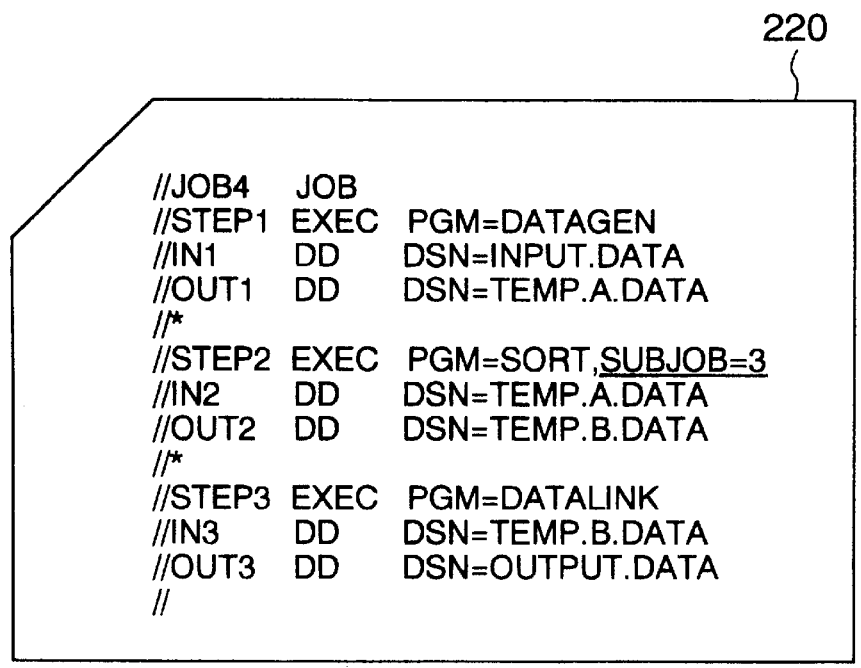
FIG. 14 is a view for illustrating another example of the job control statement in a case where given job steps included in a job are to be executed in parallel.

FIG. 14 is a view for illustrating another example of the job control statement "JCS" in the case where given job steps included in a job are to be executed in parallel. In the job control statement "JCS" shown in FIG. 14, it is assumed that three jobs shown in FIGS. 12A to 12C are assembled into one job. In this case, the three jobs as assembled into one job may be referred to as the job steps as well. Thus, the job "JOB 4" 220 shown in FIG. 14 is constituted by three job steps "STEP 1" "STEP 2" and "STEP 3" which correspond to the jobs "JOB 1", "JOB 3" and "JOB 3" shown in FIGS. 12A to 12C, respectively.

In the case of the job control statement "JCS" such as shown in FIG. 14, there may exist such possibility that a plurality of same job steps can be executed in parallel in such manner as described previously in conjunction with the example shown in FIGS. 12A to 12C. More specifically, designation "SUBJOB=n" is affixed to the execute statement "EXEC" for allowing a plurality of job steps "STEP 2" to be executed in parallel in order to reduce the time taken for executing the relevant job.

Figures 15, 16:
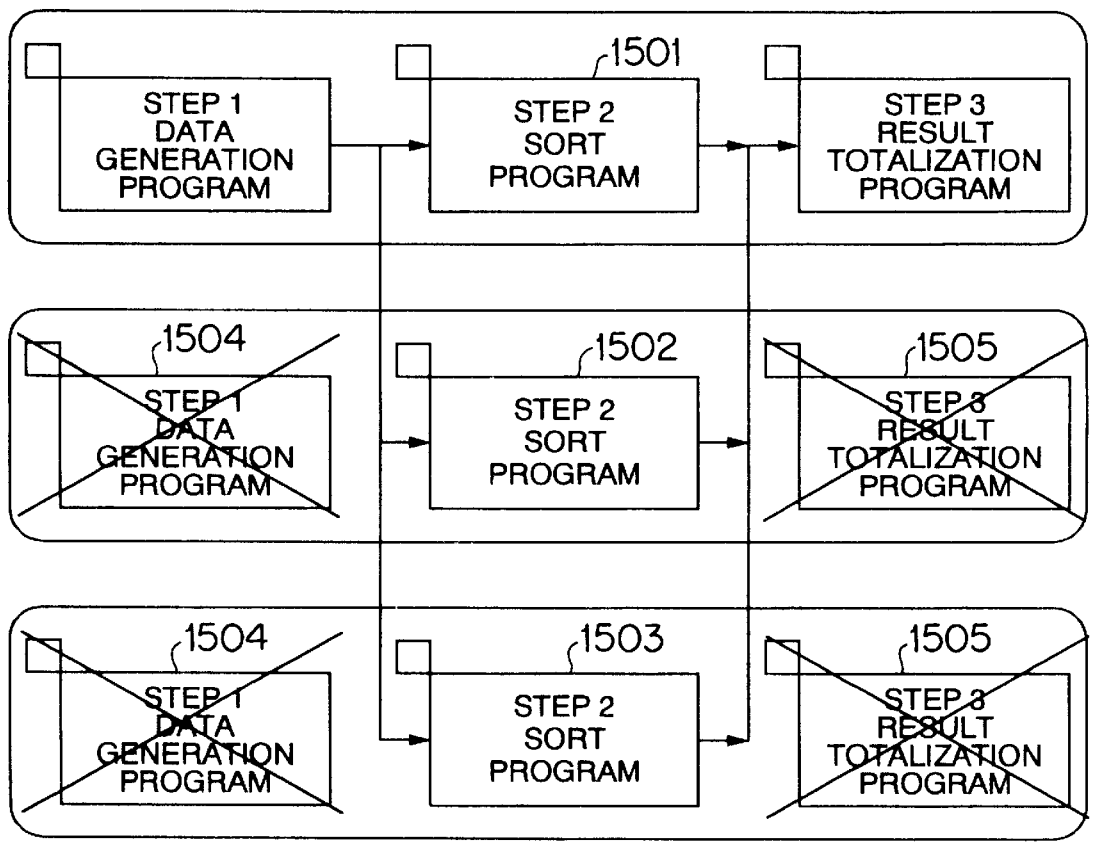
FIG. 15 is a view for illustrating an execution of individual job steps in a case where the job steps are executed in parallel.
FIG. 16 is a view showing an exemplary description of the job control statement in a case where a given job step belonging to a given job is to be executed in parallel with another job step belonging to the same job.

FIG. 15 is a view for illustrating an execution or processing procedure of the individual job steps in the case where designation "SUBJOB=3" is inserted in the control statement "JCS". It can be seen from the figure that three sort programs 1501–1503 are executed in parallel. In this manner, when the designation "SUBJOB=n" is contained in the execute statement "EXEC", a number n of the relevant job steps are executed in parallel, while in the jobs executed in second and third address spaces, execution of the job steps 1504 and 1505 except for the job step "STEP 2" are skipped, whereby the function as desired can be realized.

FIG. 16 is a view showing an exemplary description of the job control statement "JCS" in the case where a given job step belonging to a given job is to be executed in parallel with another job step belonging to the same job. It is assumed that a job "JOB 5" 230 is composed of three job steps "STEP 4", "STEP 5" and "STEP 6" and that no requirement for sequential relation is imposed between the job steps "STEP 4" and "STEP 5" in the execution thereof.

Figure 17:
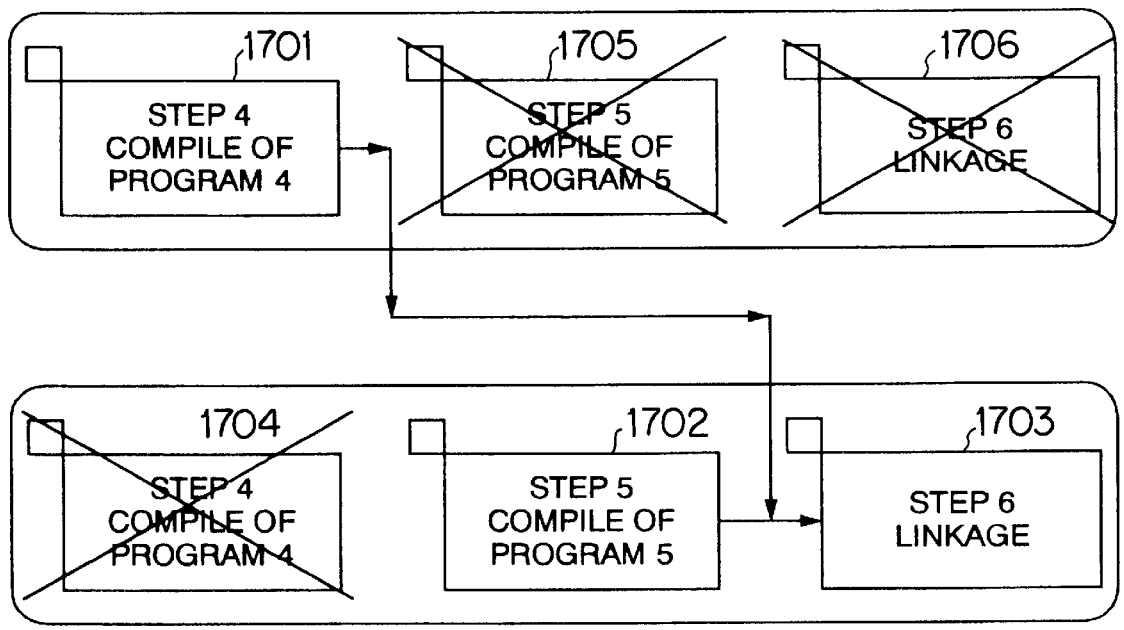
FIG. 17 is a flow chart for illustrating an execution sequence of job steps in a case where a given job step belonging to a given job is executed in parallel with another job step.

In the case of the example shown in FIG. 16, it is possible to execute the job steps "STEP 4" and "STEP 5" in parallel for the purpose of shortening the time required for execution of the job. To this end, designation "SUBJOB=YES" is inserted in the execute statement "EXEC" for the job step "STEP 4". In this conjunction, FIG. 17 is a flow chart for illustrating an execution procedure of the job steps 1701–1703 in the case where designation "SUBJOB=YES" is affixed to the execute statement "EXEC" for the job step "STEP 4".

Figure 18:
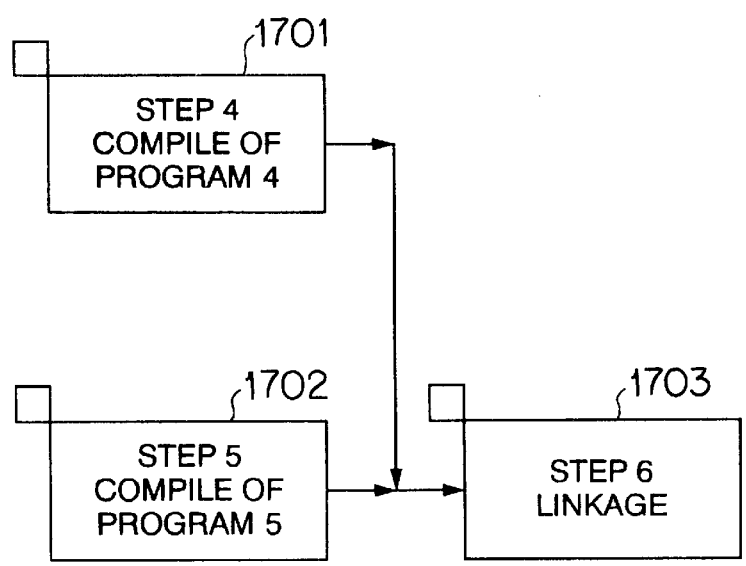
FIG. 18 is a flow chart for illustrating schematically and exemplarily a job step execution sequence in a case where a given job step and another one are executed in parallel.

When the designation "SUBJOB=YES" is contained in the execute statement "EXEC" for the subjob or job step "STEP 4", the job execution managing module 400 allocates the job "JOB 5" to two different address spaces, wherein in a first space, the job step 1704 is skipped without being executed while the succeeding job steps 1702 and 1703 are executed in this order, whereas in the second space only the job step 1701 is executed with execution of the job steps 1705 and 1706 being skipped. Owing to the execution control mentioned above, the job steps 1701 and 1702 are concurrently executed in parallel. FIG. 18 is a flow chart illustrating schematically a job step execution procedure of job steps 1701–1703 for facilitating the understanding of the inventive concept incarnated in the instant embodiment of the invention.

Figure 19A:
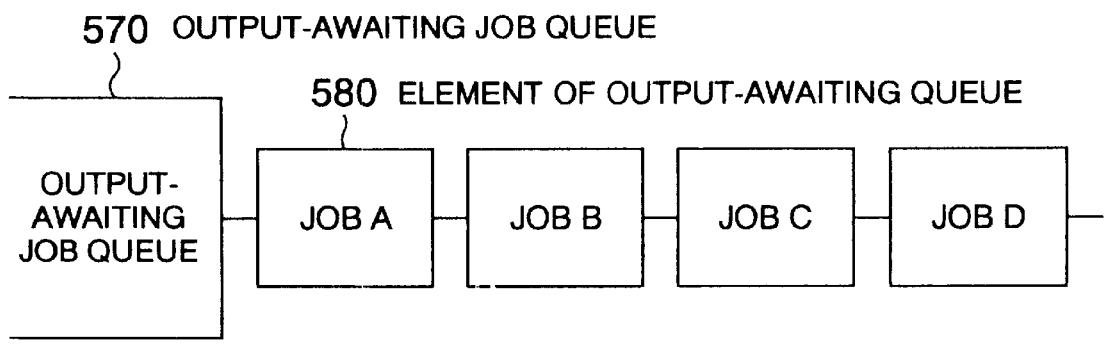
FIG. 19A is a view showing, by way of example, an output-awaiting job queue.
Figure 19B:
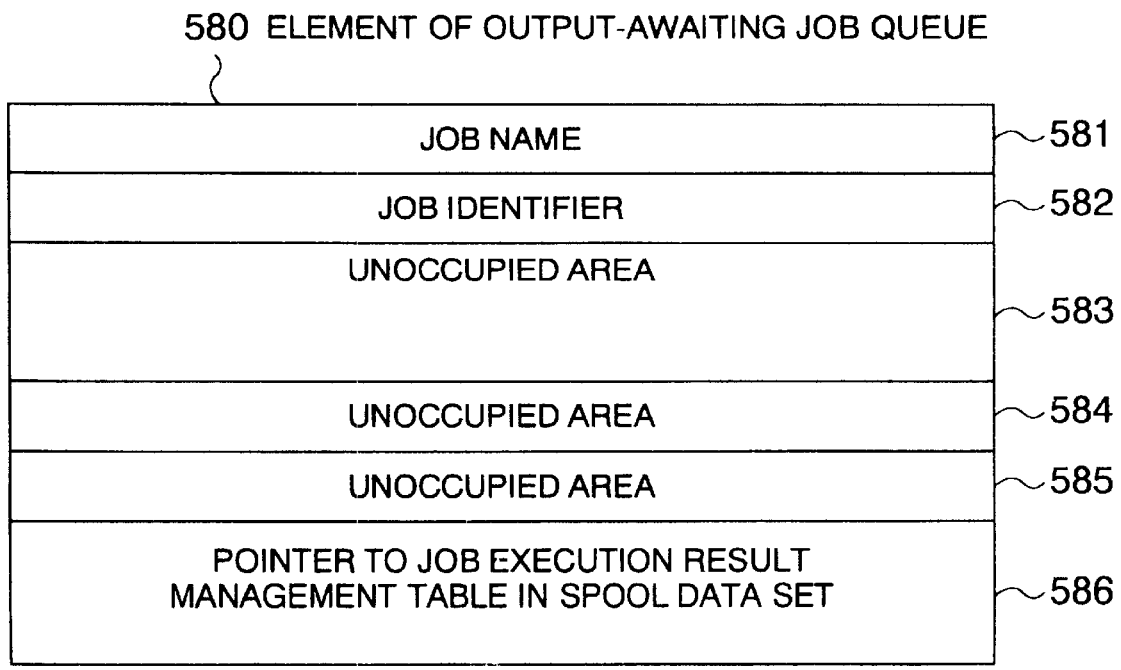
FIG. 19B is a view for illustrating a data structure of an output-awaiting job queue element, which data is referenced upon outputting results of execution of a job.
Figure 20:
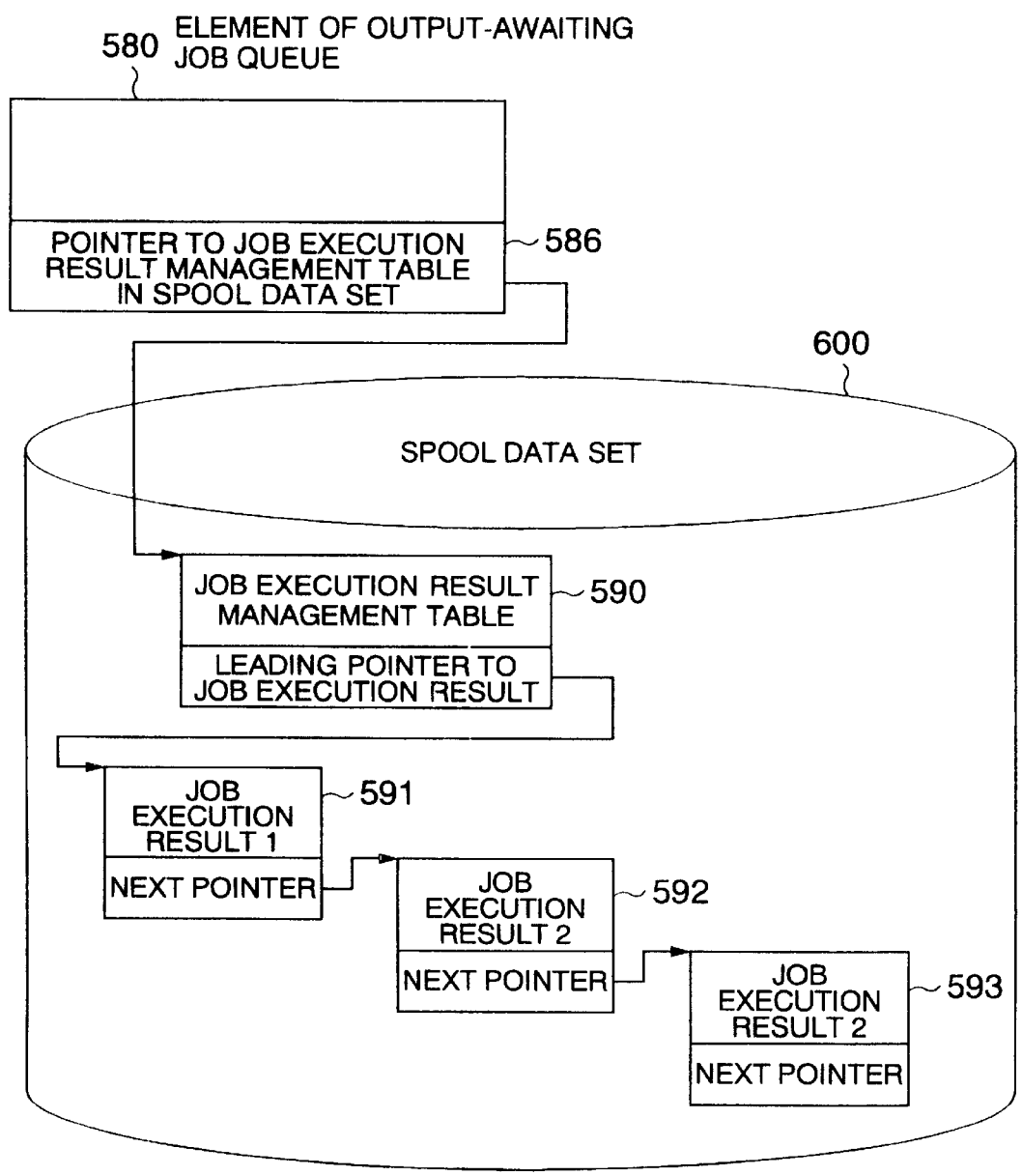
FIG. 20 is a view for illustrating, by way of example, a data structure of job execution results stored in a spool data set.

Next, referring to FIGS. 19A, 19B and 20, description will be made of a method of managing or controlling the results of job executions performed in parallel in a plurality of address spaces.

At first, description will be directed to a conventional managing method known heretofore. Usually, when execution of a job comes to an end, it is required to output the result of execution of that job. To this end, the corresponding element 560 coupled to the execution-awaiting job queue 550 is disconnected from the chain constituted by the execution-awaiting job queue 550 and then connected to the chain constituted by an output-awaiting job queue 570. Thus, the element 560 of the execution-awaiting job queue is managed as an element 580 of the output-awaiting job queue 570.

Furthermore, results of executions of jobs (591–593) are stored in a spool data set 600. The results of execution of the jobs (591, 592, 593) are managed via the element 580 of the output-awaiting job queue and a job execution result management table 590. In that case, when execution of the job concerned involves a plurality of results, the results of job executions (591, 592, 593) are managed, being chained to the spool data set 600.

The results (591, 592, 593) of job execution managed by the element 580 chained to the output-waiting job queue 570 are outputted through a printer or the like.

Now, in conjunction with the management system of the results of job executions such as described above, description will be directed to parallel execution of jobs taught by the invention. According to the present invention, the element 560 of the execution-awaiting job queue, i.e., the element 580 of the output-awaiting job queue, exists one for each job in the case of parallel execution of jobs as well. Accordingly, the job execution result management table 590 contained in the spool data set 600 exists no more than one for each job as in the case of the conventional system. Under the circumstances, results of execution of a job outputted by the job steps of that job as executed in parallel are sequentially chained to the spool data set 600 in the manner known per se heretofore. Assuming, by way of example, that these job steps are executed in parallel, the result of execution as obtained from a first job step is stored at a location labeled "JOB EXECUTION RESULT 1" 591 shown in FIG. 20, while the result obtained from the execution of the second job step is stored at a location "JOB EXECUTION RESULT 2" 592 with the result of execution of a third job step being stored at "JOB EXECUTION RESULT 3" 593.

By virtue of the arrangement described above, the management of the results of job executions can be realized by using a conventional system, which in turn means that the output processing can be performed through a conventional procedure.

As will now be understood from the foregoing, the time taken for execution of jobs as well as job steps can significantly be shortened by executing the jobs and/or the job steps in parallel in accordance with teachings of the present invention.

What is claimed is:

1. In a computer system for executing in a multiplex fashion a plurality of jobs by inputting a program for execution and jobs designating resources to be used by said program by employing job control statements and scheduling said jobs in virtual address spaces available in the computer system, a method of controlling parallel execution of a plurality of job steps included in a job, comprising the steps of:

analyzing, during execution of said plurality of job steps, a job control statement indicating that a designated job step being executed can be executed in parallel in a plurality of virtual address spaces other than a first virtual address space; and scheduling, during said execution of said plurality of job steps, said plurality of job steps of said job other than said designated job step in said first virtual address space and scheduling, during said execution of said plurality of job steps, said designated job step of said job in said other virtual address spaces for execution in parallel with said designated job step.

2. In a computer system for executing in a multiplex fashion a plurality of jobs by inputting a program for execution and jobs designating resources to be used by said program by employing job control statements and scheduling said jobs in virtual address spaces available in the computer system, said jobs including at least one job constituted by a plurality of job steps, a method of controlling parallel execution of the plurality of job steps of said one job, comprising the steps of:

analyzing, during execution of said plurality of job steps, a job control statement indicating that a designated job step is not to be executed; and scheduling, during said execution of said plurality of job steps, said job steps of said one job other than said designated job step in a first virtual address space and scheduling, during said execution of said plurality of job steps, said designated job step of said one job in another virtual address space for parallel execution of said job steps of said one job other than said designated job step in said first virtual address space and said designated job step of said one job in said another virtual address space.

3. In a computer system for executing in a multiplex fashion a plurality of jobs by inputting a program for execution and jobs designating resources to be used by said program by employing job control statements and scheduling said jobs in virtual address spaces available in the computer system, a method of controlling parallel execution of a job, comprising the steps of:

analyzing, during execution of said job, a job control statement indicating that the job can be executed in parallel; and scheduling, during said execution of said job, the execution of said job in a first virtual address space and scheduling, during said execution of said job, the execution of said job in another virtual address space for parallel execution of said job in both said first virtual address space and said another virtual address space.

4. In a computer system for executing in a multiplex fashion a plurality of jobs by inputting a program for execution and jobs designating resources to be used by said program by employing job control statements and scheduling said jobs in virtual address spaces available in the computer system, a method for controlling parallel execution of a plurality of job steps of a job, comprising the steps of:

analyzing, during execution of said job steps, a job control statement indicating that a first designated job step of said job can be executed in parallel with a second job step of said job; and scheduling, during said execution of said job steps, the execution of said job steps of said plurality of job steps in a first address space and scheduling, during said execution of said job steps, the execution of the other of said plurality of job steps in another address space for execution of said first designated job step in said first address space and the other of said plurality of job steps in said another address space.

5. A computer system, comprising:

job registration processing means for searching a job selected to be executed, said job including a plurality of job steps;

job control statement interpreting means for deciding by interpreting a job control statement designating that parallel execution can be performed for one of said plurality of job steps included in said job; and processing means for commanding said job registration processing means to schedule, during execution of said plurality of job steps, a designated one of said plurality of job steps in a first virtual address space and to schedule, during said execution of said plurality of job steps, the job steps other than said one job step of said plurality of job steps in another virtual address space.

6. A computer system, comprising:

job registration processing means for searching a job to be executed, said job including a plurality of job steps;

job control statement interpreting means for deciding, during execution of said plurality of job steps, by interpreting a job control statement designating that execution is to be skipped for a designated one of said plurality of job steps;

job step execution control means for scheduling, during said execution of said plurality of job steps, said job to be executed without said designated job step in a first address space and scheduling, during said execution of said plurality of job steps, said designated job step of said job in a second address space; and processing means for commanding said job step execution control means to execute said job in either of said first and second address spaces, respectively.

7. A storage medium storing a plurality of program codes containing instructions for jobs to be executed in a plurality of spaces implemented in a computer, wherein said jobs include a plurality of job steps, respectively, said program codes comprising:

(a) a first program step for analyzing, during execution of said plurality of job steps, a job control statement indicating that a job step can be executed in parallel; and (b) a second program step for scheduling, during said execution of said plurality of job steps, the execution of said plurality of job steps other than said job step in a first virtual address space and scheduling, during said execution of said plurality of job steps, the execution of said job step in another virtual address space.

8. A storage medium storing a plurality of program codes containing instructions for jobs to be executed in a plurality of spaces implemented in a computer, wherein said jobs include a plurality of job steps, respectively, said program codes comprising:

(a) a first program step for analyzing, during execution of said plurality of program codes, a job control statement indicating that a job step can be executed in parallel; and (b) a second program step for scheduling, during said execution of said plurality of program codes, the execution of job steps other than said plurality of job steps of a job in a first address space and scheduling, during said execution of said plurality of program codes, the execution of the other job step in another address space.

* * * * *